United States Patent [19]

Takahashi et al.

[11] Patent Number: 4,988,079
[45] Date of Patent: Jan. 29, 1991

[54] APPARATUS FOR SMELTING AND REDUCING IRON ORES

[75] Inventors: Kenji Takahashi; Katsuhiro Iwasaki; Shigeru Inoue; Haruyoshi Tanabe; Masahiro Kawakami; Kenzo Yamada; Ichiro Kikuchi, all of Tokyo, Japan

[73] Assignee: NKK Corporation, Tokyo, Japan

[21] Appl. No.: 503,805

[22] Filed: Apr. 3, 1990

Related U.S. Application Data

[62] Division of Ser. No. 246,456, Sep. 19, 1988, Pat. No. 4,936,908.

[30] Foreign Application Priority Data

Sep. 25, 1987 [JP] Japan .................. 62-240183
Oct. 15, 1987 [JP] Japan .................. 62-260603
Oct. 15, 1987 [JP] Japan .................. 62-260604
Oct. 15, 1987 [JP] Japan .................. 62-260606

[51] Int. Cl.$^5$ ............................. F27B 17/00
[52] U.S. Cl. ............. 266/156; 266/157; 266/175; 266/225

[58] Field of Search ........... 266/219, 225, 226, 156, 266/157, 175

[56] References Cited

FOREIGN PATENT DOCUMENTS

414314  6/1974  U.S.S.R. .................. 266/225

*Primary Examiner*—Melvyn J. Andrews
*Attorney, Agent, or Firm*—Frishauf, Holtz, Goodman & Woodward

[57] ABSTRACT

An apparatus for smelting reduction comprising a preheat and prereduction furnace for preheating and prereducing iron ores; a smelting reduction furnace into which iron ores, carbonaceous material and fluxing material are charged and in which the iron ores are smelted and reduced; a top-blow oxygen lance through which oxygen gas is blown into the smelting reduction furnace, having decarbonizing nozzles and post combustion nozzles; and the smelting reduction furnace having bottom and side tuyeres built respectively in a side wall and a bottom thereof.

4 Claims, 6 Drawing Sheets

APPARATUS FOR SMELTING AND REDUCING IRON ORES

This is a division of application Ser. No. 07/246,456 filed Sept. 19, 1988 now U.S. Pat. No. 4936908.

BACKGROUND OF THE INVENTION

1. Field of the Invention

The present invention relates to a method for smelting and reducing iron ores and an apparatus therefor, and more particularly to a method for charging and blowing in a smelting reduction process and an apparatus with a constitution suitable for the method.

2. Description of the Prior Art

Smelting reduction method is to be substituted for a blast furnace iron making method and has recently been under research and development to overcome a disadvantages in that the blast furnace iron making method requires not only an expensive construction cost but also a vast construction site.

It is well known that in this smelting reduction method, prereduced iron ores or iron ores, as material, are charged and furthermore carbonaceous material, as fuel and reducing agent, and fluxing material such as lime stone are charged onto a molten metal contained in a smelting reduction furnace, while oxygen is blown in the smelting reduction furnace. Thus, the carbonaceous material is melted into molten metal and C contained in the carbonaceous material is oxidated. CO gas generating from the molten metal are post-combusted into $CO_2$ gas by means of $O_2$ gas excessively blown in. Sensible heat of this $CO_2$ gas is transferred to slag covering the face of the molten metal and to iron grains suspended in the slag and then to the molten metal. In this way, heat necessary for reduction of iron ores are transferred to the iron ores to be reduced and the molten metal is efficiently produced.

However, when in order to reduce the weight of reduction of iron ores, prereduction ratio of the iron ores before transference thereof to the smelting reduction furnace, exhaust gas circulated from the smelting reduction furnace to a prereduction furnace is required to be low-oxidated gas and be of a large amount. For this reason, the combustion ratio of CO in the smelting reduction furnace is lowered and as a result, this prior art smelting reduction method is disadvantageous in that the heat efficiency ratio of the smelting reduction furnace is lowered.

SUMMARY OF THE INVENTION

In the light of the mentioned difficulty, it is an object of the present invention to provide a method for smelting reduction and an apparatus therefor wherein the heat efficiency ratio is improved in a smelting reduction furnace to promote smelting reduction without raising a prereduction ratio of iron ores in a prereduction furnace.

To attain the object, in accordance with the present invention, a method is provided for smelting and reducing iron ores which comprises the steps of:

the step of charging molten metal, carbonaceous material and fluxing material into a smelting reduction furnace;

preheating end prereducing iron ores; charging the preheated and prereduced iron ores into the smelting reduction furnace;

the step of blowing oxygen gas into the smelting reduction furnace through an oxygen lance disposed in the top of the smelting reduction furnace and having decarbonizing nozzles and post combustion nozzles; and the step of blowing in stirring gas through side tuyeres built in a side wall of a smelting reduction furnace and through bottom tuyeres built in a bottom of the smelting reduction furnace.

Furthermore, in accordance with the present invention, an apparatus for smelting reduction fitted for the method comprising:

a preheat and prereduction furnace preheating and prereducing iron ores;

a smelting reduction furnace into which iron ores, carbonaceous material and fluxing material are charged and in which the iron ores are smelted and reduced;

a top-blow oxygen lance through which oxygen gas is blow in into the smelting reduction furnace, having decarbonizing nozzles and post combustion nozzles; and the smelting reduction furnace having bottom tuyeres built respectively in a side wall and a bottom of the smelting reduction furnace.

The object and other objects and advantages of the present invention will become clear from the detailed description to follow, taken in conjunction with the appended drawings.

DESCRIPTION OF THE PREFERRED EMBODIMENT

Figure 1:
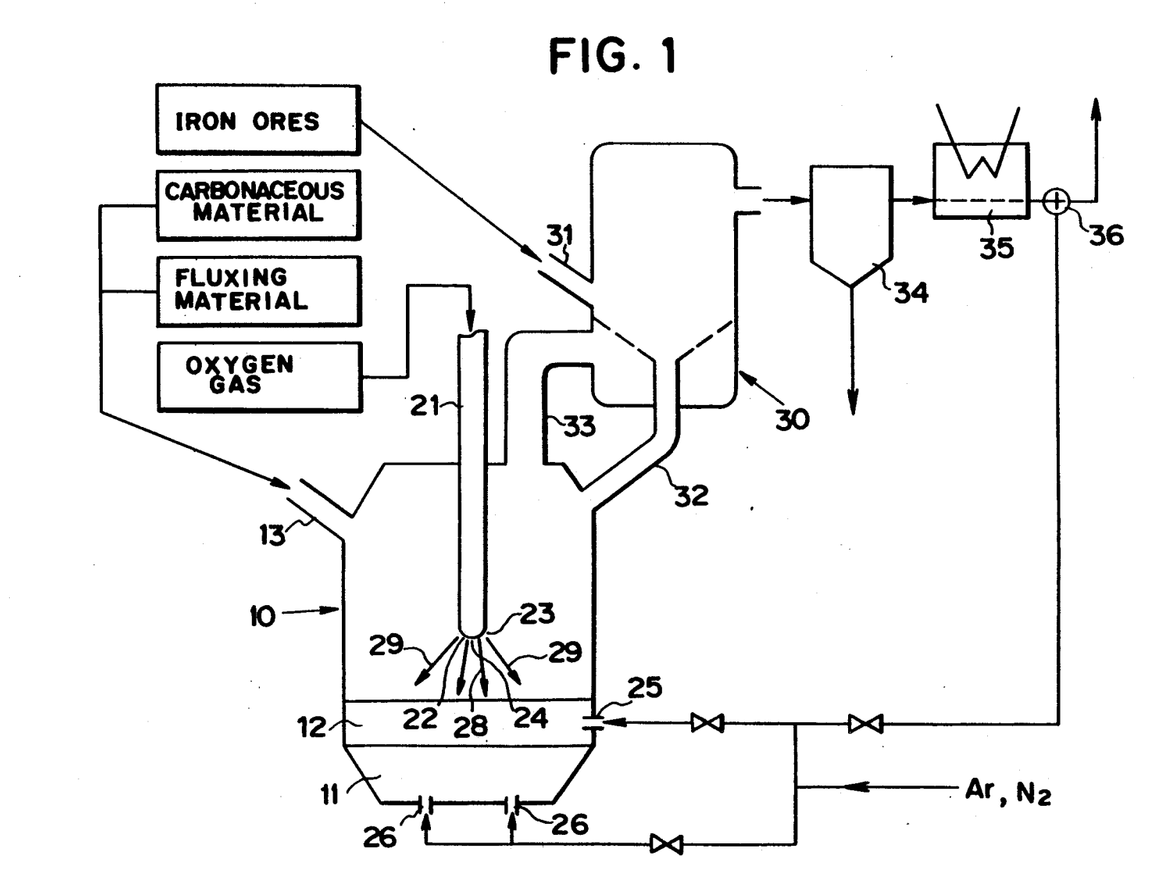
FIG. 1 is a block diagram illustrating an embodiment of an apparatus for the method of the present invention.

Now referring specifically to the drawings, a preferred embodiment of the present invention will be described. FIG. 1 of the drawing shows a block diagram of an embodiment of an apparatus used for a method for smelting and reducing iron ores according to the present invention. In a smelting reduction furnace 10, molten metal bath 11 and slag layer 12 are formed, first shoot 13 through which lime stone and flux is set in an upper portion of the smelting reduction furnace and oxygen lance 21 through which oxygen gas is blown in is vertically inserted down into the smelting reduction furnace.

Figure 2:
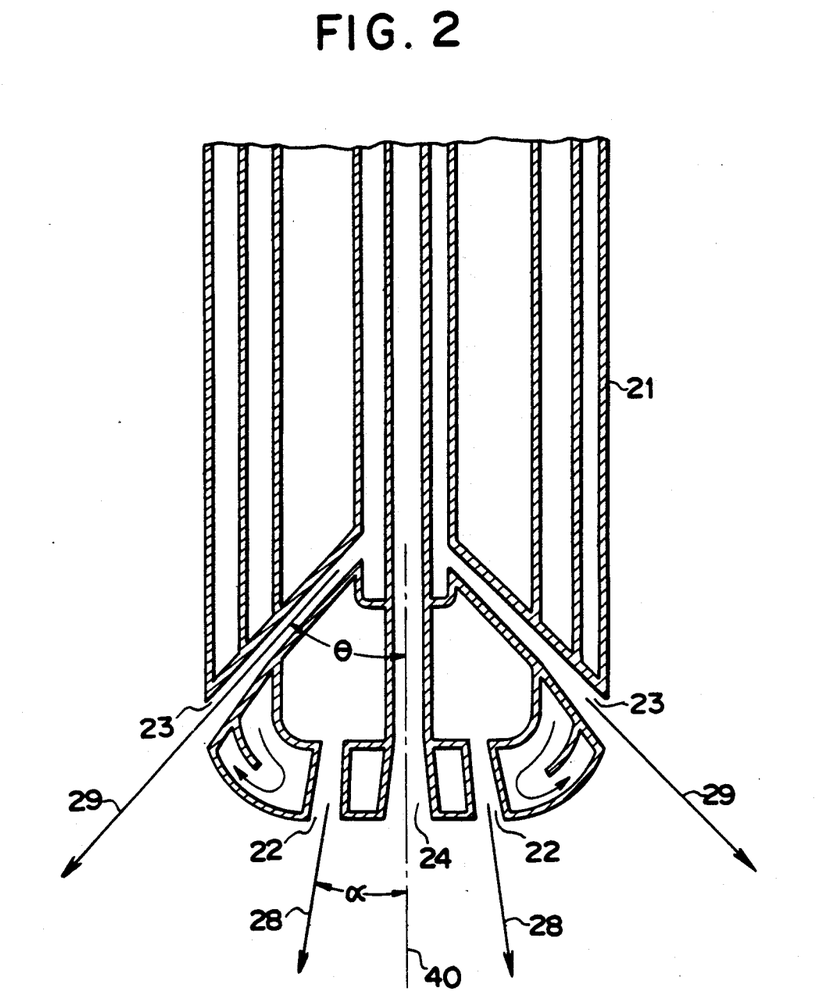
FIG. 2 is a view illustrating an enlarged tip of an oxygen lance of a smelting reduction furnace included in the apparatus for the method of the present invention.

FIG. 2 of the drawing illustrates an enlarged vertical section view of the tip of oxygen lance 21 used for an embodiment of a method for smelting and reducing iron ores according to the present invention. As seen from FIG. 2, decarbonizing nozzles 22 and post combustion nozzles 23 are arranged in the oxygen lance 21 so as to supply oxygen gas independently through the decarbonizing nozzles and the post combustion nozzles from individual oxygen supply sources set outside the smelting reduction furnace by means of controlling a pressure and a flow amount respectively.

Furthermore, center nozzle 24 for supplying mainly carbonaceous material, lime stone or the like other than iron ores is arranged, passing through the center tip of the oxygen lance. The center nozzle can be replaced by the decarbonizing nozzles, thereby to introduce the carbonaceous material and the lime stone or the like together with the oxygen gas, depending on capacity and operational condition of the furnace 11. Arrow symbols 28 and 29 at the tip of oxygen lance 21, each, show directions of injecting out oxygen gas respectively through the decarbonizing nozzles and the post combustion nozzles. Chain line 40 is the center axis of the oxygen lance.

Above said smelting reduction furnace 10, there is provided preheat and prereduction furnace 30, which is a fluid bed type reaction vessel, having second sheet 31 and third sheet 32. Through the second shoot 31, iron ores are charged into the preheat and prereduction furnace and through the third shoot leading from the preheat and prereduction furnace to the smelting reduction furnace the iron ores preheated and prereduced are transferred and charged into the smelting reduction furnace.

In addition, leading pipe 33 connects smelting reduction furnace 10 to preheat and prereduction furnace 30, exhaust gas generated from the smelting reduction furnace is transferred to the preheat and prereduction furnace. From the view point of material, equipment cost, smooth operation and so forth, as the preheat and prereduction furnace, a shaft furnace type vessel with a good heat efficiency or a rotary kiln type vessel useful for cost reduction and easy operation can be employed without any difficulty in carrying out the present invention.

Furthermore, hot cyclone 34 for removing dust from exhaust gas generating from preheat and prereduction furnace 30 and steam generator 35 for obtaining steam by making use of sensible heat of the exhaust gas, each, are set, connected with the preheat and prereduction furnace as shown in FIG. 1. On the other hand, side tuyeres 25 and bottom tuyeres 26 through which stirring gas is respectively blown in are built in a side wall and a bottom of smelting reduction furnace 10, each. Furthermore, gas selector valve 38 is set, which controls transfer direction of the exhaust gas coming out of steam generator so as to send the exhaust gas to side tuyeres 25 and bottom tuyeres 26 or to exhaust the same to the outside of the system. It should be noted that the steam generator can be alternated to preheat iron ores, using the exhaust gas generating from the preheat and prereduced furnace.

Now, a preferred embodiment of a method of the present invention, using an apparatus constituted as above mentioned will be described.

Before iron ores are charged into a smelting reduction furnace, so called seed molten metal is already charged therein in ordinary operation to make the operation start up smoothly and quickly. When the seed molten metal is not in the smelting reduction furnace, iron scraps are melted to prepare the seed molten metal.

At the start up of the operation, no slag exists. Slag such as at least one selected from the group consisting of basic oxygen furnace slag, smelting reduction furnace slag, blast furnace slag and electric furnace slag is charged together with carbonaceous material and the slag is melted with combustion of the carbonaceous material by oxygen. Iron ores do not begin to be charged until an amount of slag reaches 30 kg per 1 ton molten metal bath in the smelting reduction furnace. If the amount is less than 30 kg, the slag does not work satisfactorily as a solvent, while if the amount is over 100 kg, the effect of the slag, as a solvent, hits the ceiling. Charging amount of carbonaceous material and blowing amount of oxygen gas are increased in proportion to charging amount of iron ores. But, unless the start-up slagging is completed, heat efficiency is insufficient or temperature of molten metal does not rise promptly. As a result, abnormal operation such as melting loss of a furnace wall or slopping occurs.

Fluxing material is normally charged in the form of bulky lumps or rough grains into smelting reduction furnace 10. However, in case that it is necessary to shorten a time of melting the fluxing material, it is effective that the powdered fluxing material is blown in together with carrier gas through oxygen nozzle 21 or side tuyeres 25 and bottom tuyeres 26. 80 kg/T. molten metal, basic oxygen furnace slag was blown in through tuyeres 26 by using Ar or $N_2$ inert gas, as carrier gas. On the other hand, in comparison, as the normal method, 60 kg/T. molten metal lime stone and 20 kg/T. molten metal silica were charged through first shoot 13. As to the time period from the start of blowing up to the start of charging the iron ores, the method using carrier gas required 14 minutes, while the normal method required 20 minutes.

After molten slag is thus formed, iron ores, as material of molten metal, is charged into smelting reduction furance 10, and the smelting reduction of the iron ores are started. Normal and basic operational conditions such as production amount of molten metal, charging amount of iron ores, blowing amount of oxygen gas are shown in Table 1. An operation example described hereinbelow was carried out on the same conditions as those shown or the like.

TABLE 1

| Smelting Reduction Furnace | | Preheat and prereduction Furnace | |
|---|---|---|---|
| Molten Metal | 27.3 (t/Hr) | Iron Ores | 40.1 (t/Hr) |
| Iron Ores | 40.1 (t/Hr) | Preheat temp. | 800 (°C.) |
| Silica | 18 (t/Hr) | Prereduction Ratio | 15% |
| Lime Stone | 3 (t/Hr) | | |
| Oxygen Gas | | | |
| Decarbonization | 6650 (Nm$^3$/Hr) | | |
| Post combustion | 6650 (Nm$^3$/Hr) | | |
| Temp. of Molten Metal | 1510 (°C.) | | |
| [C] | 4.8% | | |

Iron ores, carbonaceous material and lime stone which have been charged onto molten metal bath 11 and slag layer 12 through first shoot 13 are amply stirred by stirring gas which has been blown in through side tuyeres 25 and bottom tuyeres 26, thereby the reduction reaction being promoted. The stirring gas used for the stirring is process gas which is exhaust gas from steam generator 35, $N_2$ and/or Ar and is made use of properly, depending on operation conditions and material gas.

If a flow amount of stirring gas is excesive, the stirring gas is blown out through the surface of slag layer 12 to make blow-out gas channeling and the affect of the stirring is lost, or at least cannot be expected. Preferable range of the flow amount of the stirring gas blown in through side tuyeres 25 is 0.3 to 2 $Nm^3$/min./T. molten metal and the preferable range of the flow amount of the stiring gas through each of bottom tuyeres 26 is 0.5 to 3 $Nm^3$/T. molten metal bath.

Figure 3:
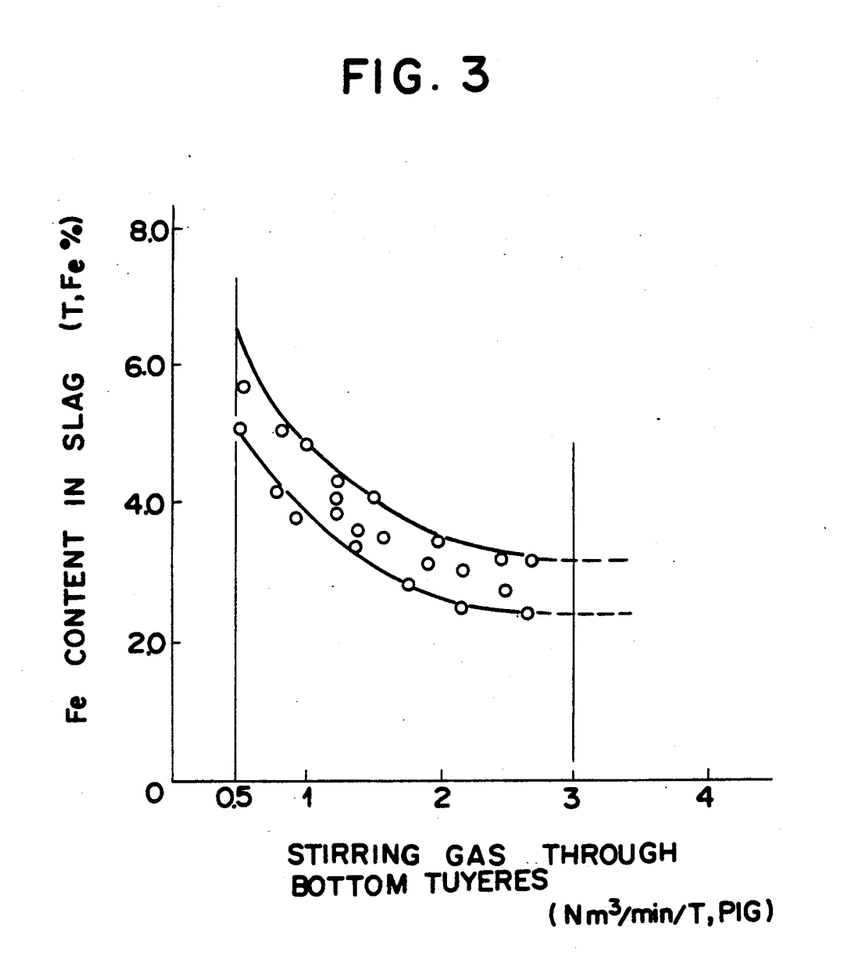
FIG. 3 is a graphic representation showing a relation between Fe content in slag (T, Fe) and flow amount of stirring gas blown in through bottom tuyeres built in a bottom of the smelting reduction furnace according to the present invention.

Now with specific reference to FIG. 3, a typical example of the blow-in of the stirring gas will be described. FIG. 3 shows graphically a relation between Fe content in slag (T,Fe) and amount of stirring gas blown in through bottom tuyeres 26. The Fe content in slag affects a yield of molten metal to be produced and in this respect, it is clear that the less the Fe content in slag is, the better the yield is. This graphic representation gives a case that the flow amount of the stirring gas blown in through side tuyeres 25 is constantly set as 1.0 $Nm^3$/min./T. molten metal bath. The amount of the Fe content in slag shows the lowest value, when the blowing amount, of the stirring gas is 3.0 $Nm^3$/min./T. molten metal bath, and the effect of the reduction hits the ceiling even if the flow amount is raised more than 3.0 $Nm^3$/min./T. molten metal bath. On the other hand, if the flow amount is less than 0.5 $Nm^3$/min.T, molten metal bath, there is possibility that slopping will occur due to high slag iron content. Consequently, the flow amount of the stirring gas blown in through tuyeres 26 ranges preferably 0.5 to 3.0 $Nm^3$/min./T. molten metal. 2 to 3 $Nn^3$/min./T. molten metal is more preferable.

Figure 4:
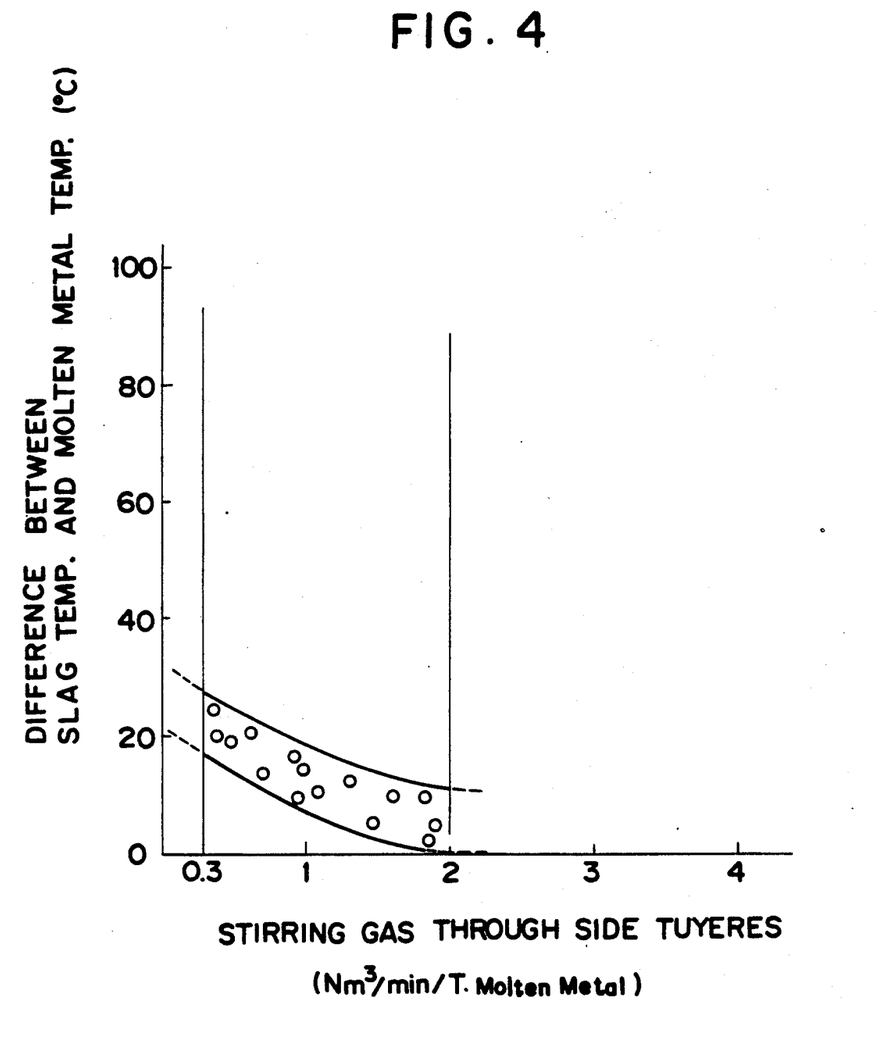
FIG. 4 is a graphic representation showing a relation of a difference between temperatures of slag and molten metal with flow amount of stirring gas blown in through side tuyeres built in a side wall of the smelting reduction furnace according to the present invention.

FIG. 4 shows graphically a relation of temperature difference between molten slag and molten metal in the smelting reduction furnace with blow amount of stirring gas through side tuyeres 25. The temperature difference indicates a degree of stirring molten metal bath 11 and slag layer 12. The small difference means that the stirring is amply performed. In other words, it is shown that the heat transfer efficiency to the molten metal is high and consequently, the heat efficiency is good. The graph gives a case that the flow amount of stirring gas through bottom tuyeres 26 is constantly set as 1.8/min./T. molten metal bath. The mentioned temperature difference shows the lowest when the flow amount of the stirring gas is 2.0 $Nm^3$/min./T. molten metal bath. Even if the flow amount of the stirring gas is increased more than 2.0 $Nm^3$/min./T. molten metal bath, the effect of reducing the temperature balance hits the ceiling. On the contrary, if the flow amount is less than 0.3 $Nm^3$/min./T. molten metal bath, the temperature difference is excessive to allow. Consequently, the flow amount of the stirring gas through the side tuyeres ranges preferably 0.3 to 2.0 $Nm^3$/min./T. molten metal.

Furthermore, the temperature difference is 40 to 60° C. in case that side tuyeres 25 are not built in the side wall of the smelting reduction furnace. As shown in FIG. 4, if the stirring gas is blown in through side tuyeres 25, the temperature difference is 30° C. or less, and the effect of the stirring is remarkable.

Oxygen gas blown in through decarbonizing nozzles 22 oxidates the carbonaceous material to supply heat enough to reduce iron ores. In addition, oxygen gas is blown in through post combustion nozzles 23, and this oxygen gas is mainly consumed for burning CO gas generated from carbonaceous material by means of oxidation in molten metal bath 11 and slag layer 12.

Figure 5:
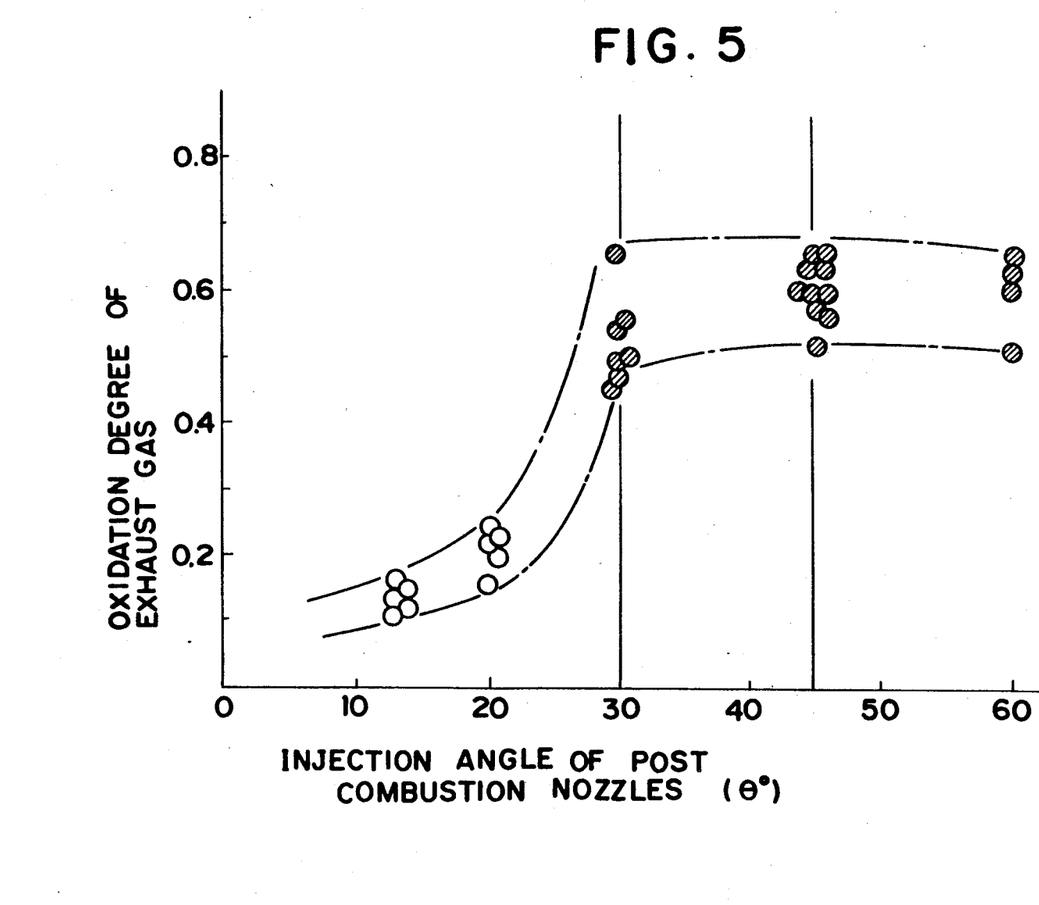
FIG. 5 is a graphic representation showing a relation between an oxidation degree of exhaust gas generating from the smelting reduction furnace and an injection angle for a post combustion nozzle according to the present invention.

In FIG. 2, chain line 40 indicates the center axis of oxygen lance 21. An injection angle of $\alpha$ of decarbonising nozzles 22 is determined as 15° or less, based on the conventional BOF oxygen lance, where $\alpha$ is an angle formed by chain line 40 and arrow 28 which is the center axis of decarbonizing nozzles 22 and shows a blowing direction. However, an injection angle of $\theta$ of combustion nozzles 23 has an important role of improving the heat efficiency of the smelting reduction furnace, where $\theta$ is an angle formed by chain line 40 and arrow 29 which is the center axis of post combustion nozzles 23 and shows a blowing direction. A preferable range of this injection angle is determined, based on a relation between the slope angle and the oxidation degree of the exhaust gas generated from the smelting reduction furnace. The relation is graphically represented in FIG. 5. The degree of the oxidation (OD) is given by the following equation:

$$OD=(CO_2+H_2O)/(CO+CO_2+H_2+H_2O)$$

As seen from FIG. 5, if the injection angle of $\theta$ is less than 30°, $CO_2$ produced by post combustion becomes easy to be reduced by C contained in ferrous grains splashed from molten metal bath 11 or C of carbonaceous material and the OD represented by the equation decreases remarkably. Consequently, the post combustion efficiency i.e. the heat efficiency of the smelting reduction furnace is lowered. Furthermore, if the injection angle of $\theta$ is over 45°, melting loss of the inner wall of the smelting reduction furnace caused by oxygen gas coming out of the post combustion is remarkably increased. As this result, the preferable range of the injection angle of $\theta$ is 30 to 45°.

As described in the foregoing, oxygen gas is blown in by means of the post combustion nozzles. However, if the basicity of slag is not appropriate, the operation is disturbed. With specific reference to FIG. 6, the preferable range of the basicity will be described.

Figure 6:
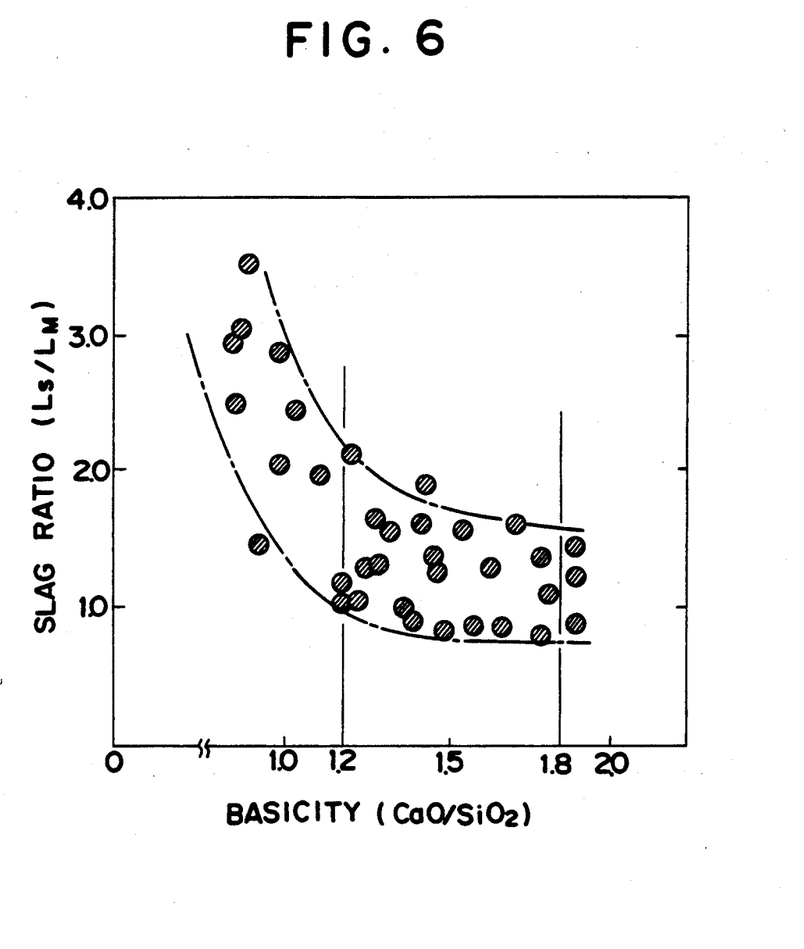
FIG. 6 is a graphic representation showing a relation between a slag ratio and basicity of slag according to the present invention.

FIG. 6 shows a relation between a slag ratio and basicity of slag. The slag ratio is represented by $L_S/L_M$. On the Y axis, $L_S$ represents thickness of slag layer 12 and $L_M$ represents depth of molten metal bath 11. The drop of the basicity of slag is caused mainly because $SiO_2$ contained in coal which is charged into the smelting reduction furnace is melted into slag when the smelting reduction reaction proceeds in the smelting reduction furnace. As seen from FIG. 6, slag if the basicity goes down less than 1.2, slag foaming increases and this causes slopping. Slopping gives unfavourable influence to the operation of the smelting reduction operation greatly. In order to reduce this phenomenon, fluxing material containing a large amount of CaO such as lime stone, burnt dolomite or basic oxygen furnace slag granule is added to slag to increase the basicity of the slag. On the other hand, if the basicity is over 1.8, Fe content in slag increases and this results in causing a drop of yield of the molten metal. As mentioned, the basicity can be reduced by $SiO_2$ contained in coal. In addition, in order to reduce the basicity quickly, powder coal is blown in through nozzle 24 of oxygen lance 21 or side tuyeres 25 and/or bottom tuyeres 26. Addition of fluxing material raising the basicity is carried out similarly. Ordinarily the fluxing material is supplied through first shoot 13. To control the basicity quickly, powder fluxing material is blown in through nozzle 24 of oxygen lance 21 or side tuyeres 25 and/or bottom tuyeres 26.

What is claimed is

1. Apparatus for smelting and reducing iron ores, comprising:

preheat and prereduction furnace means for preheating and prereducing iron ores, and for generating hot exhaust gas;

smelting reduction furnace means, into which iron ores, carbonaceous material and fluxing material are charged, for smelting and reducing the iron ores charged therein;

a top-blow oxygen lance through which oxygen gas is blown in into the smelting reduction furnace means, said oxygen lance having decarbonizing nozzles and post combustion nozzles;

said smelting reduction furnace means having bottom tuyeres and side tuyeres for blowing in stirring gas, said bottom tuyeres being built in a bottom portion of said smelting reduction furnace means and said side tuyeres being built in a side wall portion of said smelting reduction furnace means;

hot cyclone means for removing dust from said exhaust gas generated from said preheat and prereduction furnace means;

means for feeding exhaust gas, from which dust has been removed, to said bottom and side tuyeres for use as a stirring gas; and steam generator means for generating steam from heat of said exhaust gas generated from said preheat and prereduction furnace means.

2. The apparatus of claim 1, wherein:

said decarbonizing nozzles of said oxygen lance have a blowing direction or injection angle of 15° or less relative to a center axis of the oxygen lance; and said post combustion nozzles of said oxygen lance have a blowing direction or injection angle of 30 to 45° relative to said center axis of said oxygen lance.

3. The apparatus of claim 1, wherein said top-blow oxygen lance comprises a single oxygen lance.

4. The apparatus of claim 3, wherein said single oxygen lance is mounted substantially at the center of the smelting reduction furnace means.

* * * * *

UNITED STATES PATENT AND TRADEMARK OFFICE
CERTIFICATE OF CORRECTION

PATENT NO. : 4,988,079

DATED : January 29, 1991

INVENTOR(S) : TAKAHASHI et al

It is certified that error appears in the above-identified patent and that said Letters Patent is hereby corrected as shown below:

Column 1, line 66:

Change "end" to --and--.

Signed and Sealed this

Twenty-first Day of July, 1992

Attest:

DOUGLAS B. COMER

Attesting Officer    Acting Commissioner of Patents and Trademarks